H. P. KNOBLOCK.
TOASTER.
APPLICATION FILED JULY 14, 1911.
1,011,813.
Patented Dec. 12, 1911.
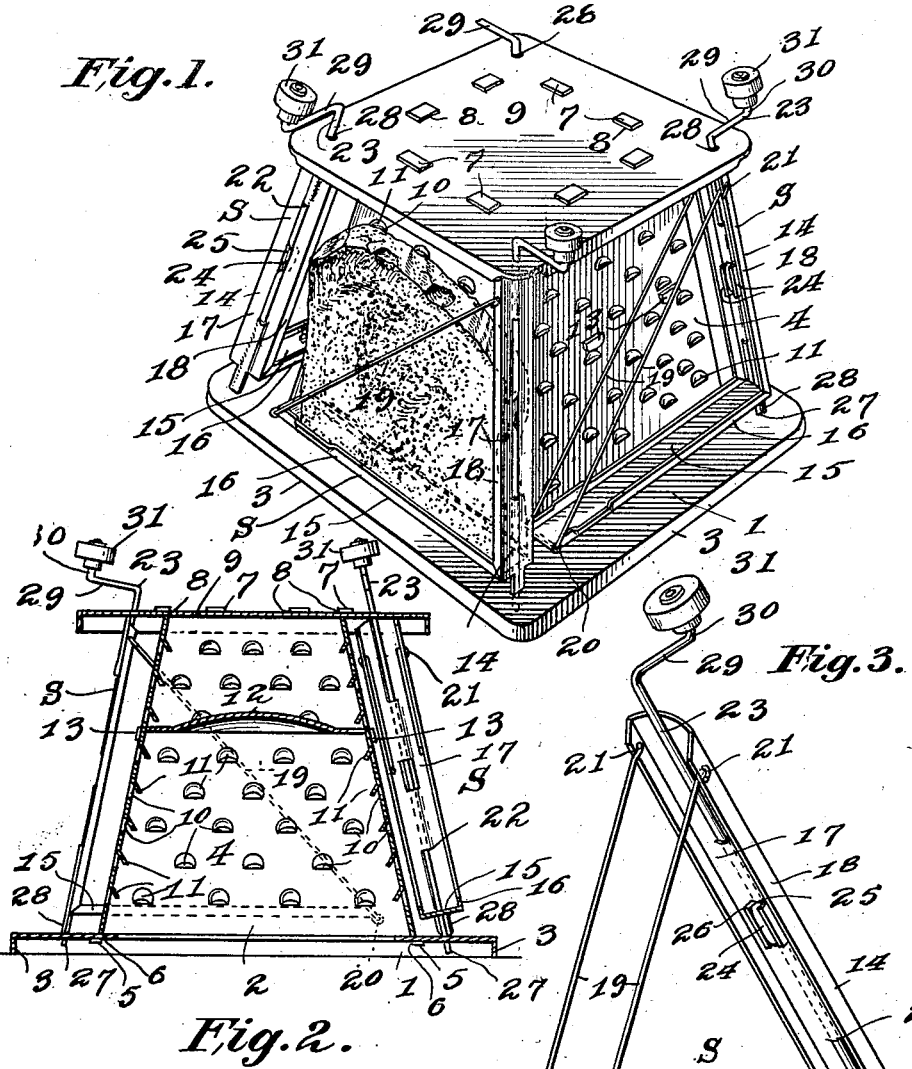
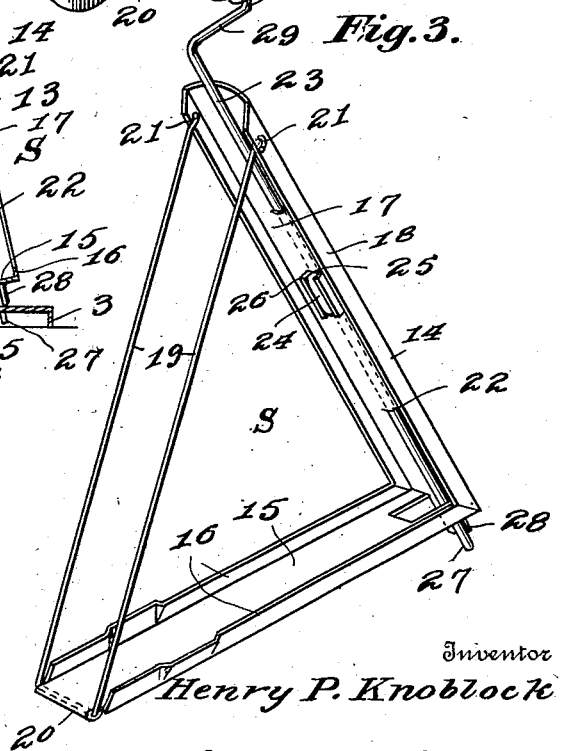
Witnesses
N. H. Lybrand
R. B. Cavanagh
Inventor
Henry P. Knoblock
By Victor J. Evans
Attorney

UNITED STATES PATENT OFFICE.

HENRY P. KNOBLOCK, OF PITTSBURGH, PENNSYLVANIA.

TOASTER.

1,011,813.

Specification of Letters Patent.

Patented Dec. 12, 1911.

Application filed July 14, 1911. Serial No. 638,481.

*To all whom it may concern:*

Be it known that I, HENRY P. KNOBLOCK, a citizen of the United States, residing at Pittsburgh, in the county of Allegheny and State of Pennsylvania, have invented new and useful Improvements in Toasters, of which the following is a specification.

The present invention relates to certain novel and useful improvements in toasters, and has particular application to a device of the class described adapted especially for use in toasting sliced bread and other material.

In carrying out my invention, it is my purpose to provide a toaster embracing among other features a heat radiating device, and one or more supports for the slices of bread located adjacent to said device, and so mounted and arranged that they may be operated to bring first one side and then the other side of each slice of bread into the toasting zone of the heated gases diffused by the radiating device. After the bread has been thoroughly toasted on both sides, the support or supports may be moved to an intermediate position to permit the ready removal of the slice or slices.

In the preferred embodiment of my invention, as delineated in the accompanying drawings, and herein described, the major portion of the toaster is composed of sheet metal with the parts so constructed and arranged that the employment of solder or numerous rivets in the assembling of a device is avoided thereby reducing the cost of manufacture.

With the above-recited objects, and others of a similar nature in view, the invention consists in the construction, combination and arrangement of parts, set forth in and falling within the scope of the appended claims.

In the accompanying drawing:—Figure 1 is a perspective view of a toaster embodying my invention. Fig. 2 is a vertical longitudinal sectional view taken approximately centrally through the body of the toaster shown in Fig. 1. Fig. 3 is a detail perspective view of one of the supports for the material to be toasted.

Referring now to the accompanying drawings in detail, the numeral 1 designates the base of the toaster which is constructed of sheet metal and is preferably square or rectangular in form, said plate having the central portion thereof cut out to form the relatively large opening 2, while 3 indicates a depending flange at the edge of the base plate which is adapted to rest upon the stove when the toaster is placed above the burner thereof. Mounted upon the base, over the opening 2, is the radiator 4, which in the present instance is in the form of a truncated pyramid, preferably constructed of sheet metal, the lower end of the radiator having small tongues 5, which pass through alining slots 6 in the base and are bent at an angle to secure the radiator to the base. The upper end of the radiator is similarly provided with small tongues 7, projecting through alining slots 8 in the top plate 9, said tongues being also bent to secure the top plate to the radiator. At suitable intervals the sides of the radiator are perforated with rows of small openings 10, suitably spaced apart, the small lips 11 formed in stamping out the opening being bent inwardly of the body of the radiator to form deflectors for diffusing the heated gases and at the same time such lips prevent the flame from the burner coming in contact with the slices of bread carried by the supports. Arranged transversely of the radiator and within the same is a baffle plate 12, in the present instance formed of sheet metal having radiating tongues 13 extending from the edges thereof which tongues are projected through alining openings in the walls of the radiator and then bent to secure the baffle in place, a space being left between the edge of the baffle and the adjacent walls of the radiator. As shown in the drawings, this baffle is preferably of inverted dish-shaped form, but, it will, of course, be understood that it may be of any other suitable or desired construction.

The supports for the slices of bread or other material to be toasted are indicated as an entirety by the letter S, and in the present instance I employ four of such supports, one for each side of the toaster. As all of these supports, however, are of the same construction, a description of one will suffice for all. Each support is approximately triangular in form and comprises an angular plate 14 having a lower section 15 formed with the side flanges 16, and an approximately vertical section 17 having the side flanges 18. The vertical section of the plate is preferably slightly inclined inwardly to conform approximately to the inclination of the walls of the radiator. The vertical and horizontal sections of the support are connected adjacent to their free ends by the U-shaped wire 19, the central bent portion of which is connected to the horizontal section by passing through the small tube or eye 20 formed at the end of said section, the side members of the wire then extending upward and in parallelism, the free ends being connected at 21 to the flanges 18 near the top thereof. The body portion of the vertical sections is stamped to form the alternately extending retaining and guiding grooves 22, certain of which extend inward and certain outward. These grooves run longitudinally of the sections and are adapted to receive the relatively long rod 23, which is bent intermediate its length to form the projection 24 which extends through the vertical slots 25, cut from the body of the section, the material from such cut portion being bent inwardly to form the parallel lugs 26—26 between which the projection 24 lies, so that the rod is held against movement relative to the support. The lower end of the rod shown at 27 extends below the tongue 28 at the lower edge of the vertical section said end 27 extending through a bore or opening in the base plate, while the tongue forms a bearing, the support being thus pivoted at its lower end to swing or rotate. The upper end of the rod projects through an opening 28' in the top plate and is then bent horizontally or at an angle as at 29 and thence vertically as at 30, the vertical portion having a cap or nut 31, so that by such construction a crank or handle is formed by which the rod may be turned or rotated to swing the connected support. As heretofore stated, I employ four of these supports, all being similar in construction and pivoted or mounted to swing at the vertical edges of the toaster.

From the above description, taken in connection with the accompanying drawings, the construction and operation of my toaster will be readily apparent. When it is desired to use the toaster, the latter is placed above the burner and the crank or handle turned to swing the support outward until it occupies a position intermediate the two adjacent sides of the body of the toaster, or diagonally of the same. The slice of bread is then inserted between the inclined wires, so that it lies vertically in the holder with the bottom edge upon the horizontal section and the side edge at the vertical section of the support. The handle is then turned to swing the support back into toasting position adjacent to one of the sides of the radiator. When the side of the slice exposed to the heated gases has been sufficiently toasted, the handle is turned to swing the support outward and around against the adjacent side of the radiator so that the position of the sides of the slice will be reversed and untoasted side brought into the toasting zone of the radiator. All of the toaster supports are operated in the same way, so that with the device herein shown, a number of slices of material may be simultaneously toasted.

While I have herein shown and described one particular embodiment of my invention, I wish it to be understood that I do not confine myself to all the precise details of construction herein set forth, as modification and variation may be made without departing from the spirit of the invention or exceeding the scope of the appended claims.

What I claim, is:—

1. A toaster comprising a base plate, a radiator mounted thereon, said radiator being in the form of a pyramid having perforations in the wall thereof, a top plate carried by the radiator, a rod pivotally journaled adjacent to one end in the top plate and at its opposite end in the base plate, a support carried by said rod and movable therewith, said support comprising an angular member formed of two sections and a connection formed of spaced rods extending between the ends of the sections, and a handle for turning the rod to swing the support from one side of the radiator to an adjacent side.

2. A toaster comprising a base plate, a radiator mounted thereon and having perforations therein, a baffle plate within the radiator, a top plate carried by the radiator, a support for the material to be toasted comprising an angular plate formed of an approximately vertical section and an approximately horizontal section joined to the bottom of the vertical section, inclined rod members spaced apart and connecting the horizontal and vertical sections, and a rod pivotally mounted in the top and base plates and connected to the vertical section of the support, said rod terminating at its upper end in a crank portion for rotating said rod and swinging said support to bring one side or the other of the material being toasted into toasting position relative to the radiator.

3. A toaster comprising a base plate having an opening therein, a radiator mounted thereon above the opening therein, said radiator having openings formed therein, inwardly projecting lips formed at said openings, a top plate having openings therein for receiving locking tongues formed at the top of the radiator, a vertically inclined rod pivotally mounted in the top and base plates, and terminating at its upper end in a crank portion for moving said rod, and a support for the material to be toasted comprising a horizontal section and a vertical section, connecting rods extending between said section, said vertical section having depressions therein for the passage of the body of the pivoted rod.

4. A toaster comprising a base, a perforated radiator mounted on said base, a vertically inclined pivoted rod terminating in a handle portion, said rod being bent intermediate its length, and a support for the material to be toasted comprising a horizontal section and a vertical section, and inclined connections extending between said sections, said vertical sections having depressions therein for the reception of the body of the rod and inwardly bent parallel lugs adapted to contact with the bent portion of the rod and hold the latter against movement relative to the support.

In testimony whereof I affix my signature in presence of two witnesses.

HENRY P. KNOBLOCK.

Witnesses:
E. EDMONSTON, Jr.,
RICHARD B. CAVANAGH.